United States Patent [19]

Takeuchi et al.

[11] Patent Number: 5,309,415
[45] Date of Patent: May 3, 1994

[54] INFORMATION RECORDING METHOD FOR OVERWRITING A MAGNETO-OPTIC RECORDING MEDIUM WITH TWO INTENSITIES OF LIGHT BEAMS

[75] Inventors: Koichi Takeuchi; Osamu Ito; Kyosuke Yoshimoto; Kunimaro Tanaka; Isao Watanabe; Kazuhiko Tsutsumi; Ryuichirou Arai; Yoshihiro Kiyose; Kazuhiko Nakane; Teruo Furukawa; Masayoshi Shimamoto; Yoshiyuki Nakai, all of Amagasaki, Japan

[73] Assignee: Mitsubishi Denki Kabushiki Kaisha, Tokyo, Japan

[21] Appl. No.: 734,963

[22] Filed: Jul. 24, 1991

Related U.S. Application Data

[62] Division of Ser. No. 558,673, Jul. 26, 1990, Pat. No. 5,272,684.

[51] Int. Cl.⁵ ............ G11B 13/04; G11B 11/12; G11B 11/10
[52] U.S. Cl. ................... 369/13; 360/114; 360/59
[58] Field of Search .......... 369/13; 360/59, 114; 365/122

[56] References Cited

U.S. PATENT DOCUMENTS

| | | | |
|---|---|---|---|
| 4,754,355 | 6/1988 | Takahashi et al. | 360/114 |
| 4,853,912 | 8/1989 | Akasaka et al. | 369/73 |
| 4,985,881 | 1/1991 | Saito et al. | 369/13 |
| 5,014,252 | 5/1991 | Akasaka et al. | 369/13 |
| 5,014,254 | 5/1991 | Van Rosmalen et al. | 369/13 |
| 5,020,040 | 5/1991 | Lee | 369/13 |
| 5,025,430 | 6/1991 | Takokoro et al. | 360/114 |
| 5,093,822 | 3/1992 | Kugiya et al. | 369/13 |

FOREIGN PATENT DOCUMENTS

| | | | |
|---|---|---|---|
| 58-083347 | 5/1983 | Japan. | |
| 60-251533 | 12/1985 | Japan. | |
| 60-236137 | 4/1986 | Japan. | |
| 61-229247 | 10/1986 | Japan | 360/114 |
| 0258978 | 3/1988 | Japan. | |
| 63-74145 | 4/1988 | Japan | 360/114 |

*Primary Examiner*—Hoa T. Nguyen
*Attorney, Agent, or Firm*—Wolf, Greenfield & Sacks

[57] ABSTRACT

Methods and apparatuses are disclosed for improving accuracy of recording and reproducing information onto and from a magneto-optic recording information medium. In the first method, a width of a mark formed by a relatively low intensity light beam between two kinds of light beam intensities used for recording information is made larger than a sum of a track land width and the maximum track offset of the light beam, thereby the mark formed by the relatively low intensity light beam covers the track land portion in its full width. In the first apparatus, a reflected light beam from the magneto-optic recording information medium is split into a reflected beam for information reproducing and a reflected beam for tracking and focusing servos at the reproducing, thereby the apparatus can remove part being affected by the track groove portion from the reflected light beam for information reproducing. In the second method and apparatus, an intensity ratio of the two kinds of intensities of light beams used for information recording is controlled in such a manner that a mark width formed by the relative low intensity light beam is wider than a mark width formed by the relative high intensity light beam.

7 Claims, 20 Drawing Sheets

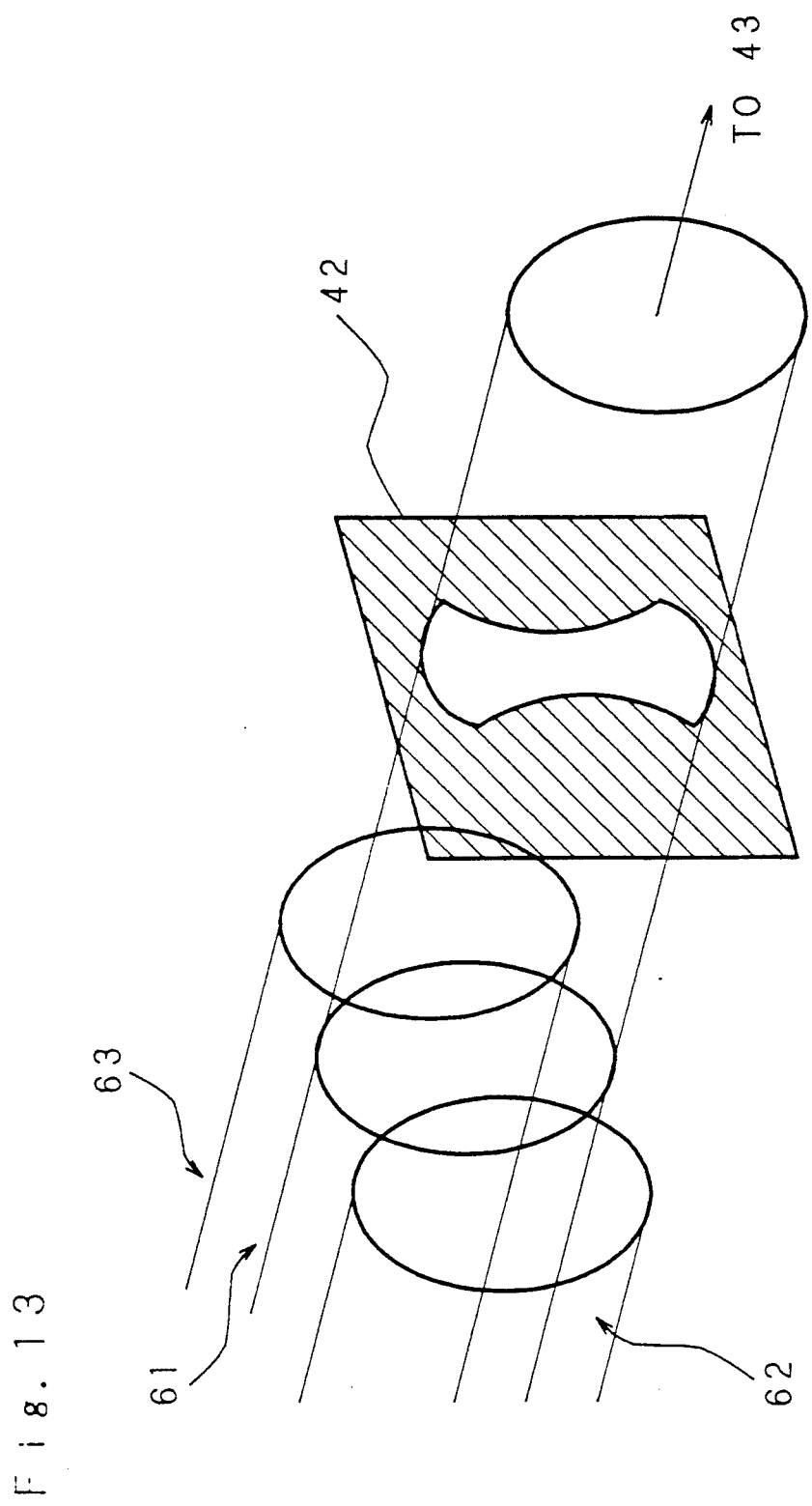

Fig. 17
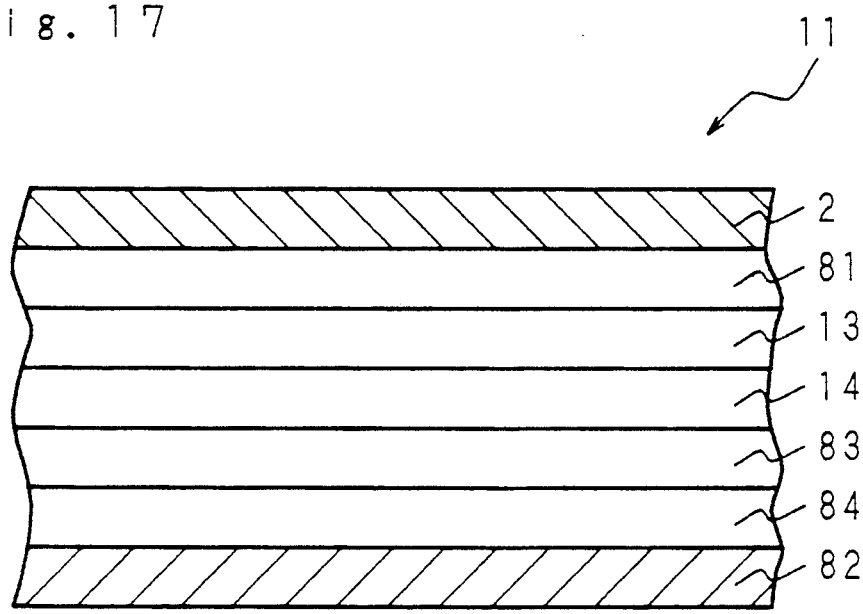
Fig. 18(a)   Fig. 18(b)
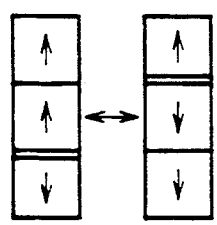 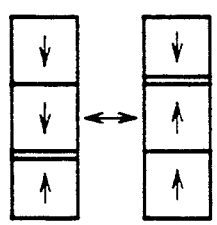  i−1 th LAYER
　　　　　　　　　　　　　　　　　i th LAYER
　　　　　　　　　　　　　　　　　i+1 th LAYER

INFORMATION RECORDING METHOD FOR OVERWRITING A MAGNETO-OPTIC RECORDING MEDIUM WITH TWO INTENSITIES OF LIGHT BEAMS

This application is a division of application Ser. No. 07/558,673 filed on Jul. 26, 1990, now U.S. Pat. No. 5,272,684.

BACKGROUND OF THE INVENTION

1. Field of the Invention

This invention relates to an information recording method for a magneto-optic recording information medium (magneto-optic disk) and a magneto-optic recording reproducing apparatus, and more particularly, to the same for magneto-optic recording information medium having so-called light modulation overwriting function which enables to directly write new information on old recorded information as it is.

2. Description of Related Art

The inventors of this application have proposed a magneto-optic recording information medium, namely, magneto-optic disk having light modulation overwriting function, and a magneto-optic recording apparatus in the Japanese Patent Application No. 1-119244 (1989).

The magneto-optic recording information medium and the magneto-optic recording apparatus according to this invention are, frankly speaking, as follows.

"A magneto-optic recording information medium comprising a first magnetic layer having vertical magnetic anisotropy and a second magnetic layer laid on the first magnetic layer which has also vertical magnetic anisotropy and is bonded to said first layer with exchange force, characterized in that: said second magnetic layer (a) does not cause flux reversal and keeps its direction of magnetization constant at recording and producing, (b) meets the requirement of $Tc_1 < Tc_2$ where $Tc_1$: Curie temperature of the first magnetic layer
$Tc_2$: Curie temperature of the second magnetic layer (c) meets the requirements of $$Hc_1 > Hw_1 + Hb, \quad Hc_2 > Hw_2 + Hb$$

at room temperatures. where $Hc_1$: coercive force of the first magnetic layer
$Hc_2$: coercive force of the record magnetic layer
$Hw_1$: shift quantity of inversion magnetic field due to exchange force of the first magnetic layer
$Hw_2$: shift quantity of inversion magnetic field due to exchange force of the second magnetic layer
$Hb$: applied magnetic field at recording ($Hb > 0$)

"A magneto-optic recording apparatus comprising a magneto-optic recording information medium having at least two magnetic layers with vertical magnetic anisotropy, one layer of which keeps its direction of magnetization constant and does not cause flux reversal at recording and reproducing, a beam emitting element which projects a beam on the magneto-optic recording information medium to record or reproduce information, and a magnetic field generator which generates a magnetic field to be applied to a portion of the magneto-optic recording information medium projected by the beam emitting element with keeping the direction of magnetic field constant."

Now, referring to the drawings, the explanation will be given in more detail as follows.

FIG. 1(a) is a schematic diagram showing an outline of a magneto-optic recording information medium and essential part of a magneto-optic recording apparatus which records information on the medium and these have been proposed in the Japanese Patent Application Laid-Open No. 1-119244 (1989) mentioned above. FIG. 1(b) is a partial section taken along a circumference of the magneto-optic recording information medium and also includes a graph showing a condition of a varying of laser beam power for information recording on the magneto-optic recording information medium.

In FIGS. 1(a) and (b), numeral 11 denotes a magneto-optic recording information medium, 20, a laser beam from a laser beam emitting element which projects the beam onto the magneto-optic recording information medium 11 to record or reproduce information, and 16, a beam spot which is generated by condensing the laser beam 20 through an objective lens 5 to be projected on the magneto-optic recording information medium 11.

Numeral 18 denotes a magnetic field generator which generates a magnetic field having a constant direction and being applied to a laser beam projected portion on the magneto-optic recording information medium 11.

Numeral 2 denotes a substrate made of glass or plastics.

Numeral 13 denotes a first magnetic layer, which is laminated on the substrate 2 and has vertical magnetic anisotropy.

Numeral 14 denotes a second magnetic layer, which is laminated on the first magnetic layer 13 and has vertical magnetic anisotropy. The second layer 14 is bonded to the first magnetic layer 13 with exchange force and does not cause flux reversal at recording or reproducing, thus keeping the direction of magnetization constant.

Numeral 7 denotes an area with binary data "1" indicating that the direction of magnetization of the first magnetic layer 13 is directed upward in FIG. 1(b).

The first magnetic layer 13 and the second magnetic layer 14 have relations $Tc_1 < Tc_2$ (where $Tc_1$ and $Tc_2$ are Curie temperatures of the first and the second magnetic layers 13 and 14 respectively) and $Hc_1 > Hw_1 + Hb, Hc_2 > Hw_2 + Hb$ (where $Hc_1$ and $Hc_2$ are coercive forces of the first and the second magnetic layers 13 and 14 at a room temperature, $Hw_1$ and $Hw_2$ are exchange bonding force of the first and the second magnetic layers 13 and 14 at a room temperature, and $Hb$ is a magnetic field generated by the magnetic field generator 18) and are composed of rare earth metal-transition metal alloy.

In order to perform the so-called light modulation direct overwriting, it is necessary to control the intensity of the laser beam 20 from the laser beam emitting element to three levels of high, intermediate and low. At the two levels of the high and the intermediate levels of the laser pulse beam, in the case when a magnetic layer other than one which does not cause flux reversal is at the high level, either one of a pit (mark) with upward direction of magnetization or a pit with downward direction of magnetization is formed and when at the intermediate level, the other pit is formed. Thus reading of information can be performed with the low level laser beam.

Next, operation is described.

The magneto-optic recording information medium 11 is rotated in the direction of an arrow a in the drawing.

This medium 11 has two magnetic layers 13 and 14 as described above and is formed with a substrate 2, the first magnetic layer 13 and the second magnetic layer 14 in order from the side of laser projection.

Now, the first magnetic layer 13 is a reading layer as well as a recording layer for holding magnetization orientation indicative of information "0" or "1" and the second magnetic layer 14 is provided to effect overwriting. This second magnetic layer 14 is called an initialization layer and has both the functions of the conventional auxiliary layer and the initialization magnet.

Characteristics of the first magnetic layer 13 and the second magnetic layer 14 are as follows:

Giving notations $Tc_1$ and $Tc_2$ to each Curie temperature of both the layers, then $$Tc_1 < Tc_2.$$

Further, giving notations $Hc_1$ and $Hc_2$ to each coercive force of both the layers, and notations $Hwi$ ($i=1, 2$) to each exchange bonding force of both the layer, then $$Hc_1 > Hw_1 + Hb \qquad (1)$$

$$Hc_2 > Hw_2 + Hb \qquad (2).$$

Inequality (1) holds good within the range of room temperatures to a certain temperature $T_0$ lower than $Tc_1$. That is, in the range of a room temperature to temperature $T_0$, the coercive force $Hc_1$ of the first magnetic layer 13 is greater than a sum of effect of exchange bonding force $Hw_1$ and the applied magnetic field $Hb$ at recording which is generated by the magnetic field generator 18 and is not affected by the direction of magnetization of the second magnetic layer 14 and is able to hold the direction of magnetization indicative of recorded information.

Inequality (2) holds good within the whole range of operating conditions. That is, in the whole range of operating conditions, the coercive force $Hc_2$ of the second magnetic layer 14 is greater than a sum of effect of the exchange bonding force $Hw_2$ and the applied magnetic field $Hb$ at recording which is generated by the magnetic field generator 18. Therefore, once initializing the second magnetic layer 14 upward as shown in FIG. 1(b), the direction of magnetization is not reversed and the upward direction of magnetization can be mentioned.

Explanation will first be given to the case of reproducing information recorded on the first magnetic layer 13.

As shown in FIG. 1(b), the first magnetic layer is magnetized upward or downward in a thickness corresponding to a binary code "1" or "0". When reproducing information, the beam spot 16 is projected on this first magnetic layer 13 and the direction of magnetization of this projected area of the first magnetic layer 13 is converted into optical information with well-known optical Kerr effect and thus information recorded in the magneto-optic recording information medium 11 is detected.

In this case, the intensity of the laser projected on the magneto-optic recording information medium 11 is one at point A in a graph of FIG. 3 described later. In the first and the second magnetic layers 13 and 14, the maximum temperature on the beam spot 16 projected by the light beam of this intensity does not reach respective Curie temperature $Tc_1$, $Tc_2$ of both the layers. Therefore, magnetizing information is not eliminated by beam projection of the beam spot 16.

A relation between temperatures and the inversion magnetic fields of the first magnetic layer 13 is shown in a graph of FIG. 2 and a relation between intensity of the laser beams on the magneto-optic recording information medium 11 and temperatures of the magnetic layer in the laser spot is shown in the graph of FIG. 3. An inversion magnetic field is the minimum field required to reverse a direction of magnetization and is expressed by $$Hc_1 - Hw_1.$$

When a laser intensity (power) $R_1$ is applied as shown in FIG. 1(b), a relation between inversion magnetic fields and temperatures of the first magnetic layer is shown in a solid line in FIG. 2 and when a laser intensity (power) $R_0$ is applied, the relation is shown in a broken line.

The recording operation is explained when information "0" is recorded, that is downward magnetization is given to the first magnetic layer 13.

When the laser beam 20 with intensity $R_1$ is projected, the temperature of the first magnetic layer 13 in the beam spot 16 rises to $Tr_1$ in FIG. 2. Then, when the disk is rotated and the laser beam 20 is not projected on the beam spot 16, the temperature of the first magnetic layer 13 falls. As can be seen from the solid line in FIG. 2, a following inequality is valid within the range of room temperatures to $Tc_1$:

$$|Hb| > Hw_1 - Hc_1$$

Therefore, the direction of magnetization of the first magnetic layer 13 is the direction of the magnetic field generated by the magnetic field generator 18, that is, the direction of a biasing magnetic field $Hb$, namely downward direction.

The recording operation is then explained when information "1" is recorded, that is, upward direction of magnetization is given to the first magnetic layer 13.

When the laser beam with its intensity $R_0$ is projected, the temperature of the first magnetic layer 13 in the beam spot 16 rises to $Tr_0$ in FIG. 2. Then, when the disk is rotated and the laser beam 20 is not projected on the beam spot 16, the temperature of the first magnetic layer 13 falls. As can be seen from the broken line in FIG. 2, a following inequality is valid in the vicinity of the temperature $Tp$:

$$|Hb| < Hw_1 - Hc_1.$$

Therefore, the direction of magnetization of the first magnetic layer 13 is the direction in which the exchange force acts, that is, the direction of magnetization of the second magnetic layer 14, namely upward direction.

Then, when overwriting is performed by the above operation, the laser beam is intensity-modulated to become $R_1$ or $R_0$ that is the intensity at point C or B in FIG. 3 according to the binary code "0" or "1" of information, thus the overwriting can be effected on old data in real time without necessity of magnets for initializing.

The laser intensity at point A in FIG. 3 is the intensity used for reading information as mentioned above. Using this intensity at point A, the maximum temperatures of the first and the second magnetic layers 13 and 14 in the beam spot 16 do not reach respective Curie temperature $T_{c1}$ and $T_{c2}$ of both the layers. Therefore, direction of magnetization, namely, recorded information is not eliminated by beam projection on the beam spot 16.

Now, the reason is explained why the curve of temperatures of inversion magnetic fields in the first magnetic layer 13 separates into the broken line curve and the solid one according to the laser intensities $R_0$ or $R_1$ as shown in FIG. 2.

Both the magnetic layers 13 and 14 cause temperature rise due to laser projection, as to heat radiation rate, the first layer 13 has a higher one than that of the second layer 14. The reason is as follows.

(i) Because the laser beam 20 is projected from the side of the first magnetic layer 13, the maximum reachable temperature of the first layer 13 is higher than that of the second layer 14 and thus the heat radiation rate of the first layer 13 is higher than that of the second layer 14.

(ii) The first magnetic layer 13 is adjacent to the substrate 2 and radiates heat through the substrate 2.

(iii) Thickness of the first magnetic layer 13 is very thin, therefore heat radiation is great.

Thus, the heat radiation rate of the first magnetic layer 13 is higher than that of the second magnetic layer 14. Due to projection of the laser beam 20 with its intensity $R_0$, the temperature of the first magnetic layer 13 rises to $T_{r0}$ in FIG. 2 and after that drops to around $T_p$ in FIG. 2. At this time, the temperature of the second magnetic layer 14 is denoted $T_{2r0}$. Due to projection of the laser beam 20 with its intensity $R_1$, the temperature of the first magnetic layer 13 rises to $T_{r1}$ in FIG. 2 and thereafter the temperature of the first magnetic layer 13 drops to around $T_p$ in FIG. 2. At this time the temperature of the second magnetic layer 14 is denoted $T_{2r1}$, then due to difference between the heat radiation rates mentioned above, $T_{2r0} < T_{2r1}$ results.

That is, when the laser beam 20 with its higher intensity $R_1$ is projected, the temperature of the second magnetic layer 14 becomes higher when the temperature of the layer 13 is about $T_p$. Considering that the exchange bonding force has a tendency to decrease as the temperature of the magnetic layer becomes high, the exchange bonding force becomes small when the laser beam 20 with its higher intensity $R_1$ is projected. Therefore, the difference in FIG. 2 arises between the solid line and the broken line curves of the temperature varying of inversion magnetic fields of the first magnetic layer 13. This causes magnetization hysteresis in relation to temperature and enables overwriting.

Ex. 1

The magneto-optic recording information medium 11 is formed by laminating in order ferromagnetic substances, for example, first magnetic layer 13: $Tb_{23}Fe_{72}Co_5$ (thickness 500 Å) and second magnetic layer 14: $Gd_{14}Tb_{14}Co_{72}$ (thickness 1500 Å) on a glass substrate 2 by the sputtering method, for example, and the magnetic layers are bonded together by exchange force.

Curie temperature of the first magnetic layer 13 is about 180° C., and the second magnetic layer 14 has an inversion magnetic field than 1 k Oe within the range of room temperatures to 250° C. and does not cause flux reversal within the range of operating temperatures. In the first magnetic layer 13, the exchange force becomes greater than coercive force at about 150° C. The greatest difference between the exchange force and the coercive force is equivalent to a magnetic field of about 1 k Oe.

The magnetic field generator 18 is always producing a magnetic field of about 1 k Oe in a constant direction. The magneto-optic recording information medium 11 is exposed to a magnetic field stronger than the inversion magnetic field of the second magnetic layer 14 and thus the layer 14 is initially once magnetized, for example, upward and uniformly. At this time a direction of a magnetic field generated by the magnetic field generator 18 is upward and the first and the second magnetic layers 13 and 14 have the relation mentioned above.

In the magneto-optic recording information medium 11 thus constituted, owing to the above mentioned operations light modulation direct overwriting can be effected by modulating only a laser beam intensity.

Practically, signals with a linear velocity of 6 m/sec and pit length of 0.8 through 5 μm were light-modulated on the condition that the magnetic field generated by the magnetic field generator 18 is 1000 Oe; laser peak power is 16 mW; bottom power is 5 mW. Then erase ratio more than 25 dB was obtained. Reproducing was performed with laser power of 1.5 mW.

Exs. 2 through 8

There is no problem when the coercive force of the second magnetic layer 14 is sufficiently large at around Curie temperature of the first magnetic layer 13, and both the magnetic layers 13 and 14 were laminated on a glass substrate 2 by the sputtering method and thus various types of magneto-optic recording information mediums were obtained as shown in Table 1 in the same as "Ex. 1".

TABLE 1

| Ex. | 1st magnetic layer | 2nd magnetic layer |
|---|---|---|
| 2 | $Tb_{23} Fe_{72} Co_5$ 500Å | $Gd_{15} Tb_{14} Co_{71}$ 1500Å |
| 3 | $Tb_{23} Fe_{72} Co_5$ 400Å | $Gd_{14} Tb_{14} Co_{72}$ 1500Å |
| 4 | $Tb_{23} Fe_{72} Co_3$ 400Å | $Gd_{14} Tb_{16} Co_{70}$ 1500Å |
| 5 | $Tb_{23} Fe_{72} Co_5$ 500Å | $Gd_{14} Tb_{14} Co_{72}$ 1800Å |
| 6 | $Tb_{23} Fe_{72} Co_5$ 400Å | $Gd_{14} Tb_{14} Co_{72}$ 1800Å |
| 7 | $Tb_{23} Fe_{72} Co_5$ 500Å | $Tb_{30} Co_{70}$ 1500Å |
| 8 | $Tb_{23} Fe_{72} Co_5$ 500Å | $Tb_{33} Co_{65}$ 1500Å |

Using each magneto-optic recording information medium shown in Table 1 and a linear velocity of 6 m/sec, erase ratios more than 20 dB and 23 through 35 dB at the optimum power were obtained in the same way as "Ex. 1" except that the light modulation was performed as shown in Table 2, and thus the same light modulation direct overwriting as "Ex. 1" could be effected.

TABLE 2

| Ex. | generated magnetic field /Oe | peak power /mW | bottom power /mW |
|---|---|---|---|
| 2 | 1000 ± 100 | 12.0 through 17.0 | 4.0 through 7.0 |
| 3 | 1200 ± 100 | 10.0 through 15.0 | 4.0 through 7.0 |
| 4 | 1300 ± 100 | 11.0 through 17.0 | 4.0 through 7.0 |
| 5 | 1000 ± 100 | 13.0 through 17.0 | 4.5 through 7.5 |
| 6 | 1200 ± 100 | 12.0 through 15.0 | 4.5 through 7.5 |
| 7 | 800 ± 100 | 9.0 through 17.0 | 3.5 through 7.5 |
| 8 | 1200 ± 100 | 12.0 through 17.0 | 4.0 through 8.0 |

Ex. 9

As for other types of magneto-optic recording information mediums, ferromagnetic amorphous alloys of transition metals and rare earth metals are suitable. For example, by using compositions and layer thickness of first magnetic layer: $Tb_{23}Fe_{67}Co_{10}$ (thickness 500 Å) and second magnetic layer: $Gd_{12}Tb_{12}Co_{76}$ (thickness 1500 Å) good overwriting can be effected in the same as "Ex. 1".

Further, each magnetic layer may be formed by the ferromagnetic substances such as DyFeCo, TbCo, TbFe/GdCo, GdDyCo, TbDyCo, DyCo, or other magnetic layers which the first and the second layers 13 and 14 allow to participate in operations only at about room temperatures may be contained in the magneto-optic recording information medium, in this case the second magnetic layer 14 does not cause flux reversal in the operating range, in addition a dielectric layer may be contained in the medium 11 to improve signal quality or to reduce oxidation corrosion of the magnetic layer.

FIG. 4(a) is a schematic diagram showing an optical system configuration of the abovementioned magneto-optic recording apparatuses.

In this figure, numeral 11 denotes the abovementioned magneto-optic recording information medium. A laser beam 20 emitted from a laser beam emitting element 31 is projected on the magneto-optic recording information medium 11 through a collimator lens 32, a beam splitter 33, and an objective lens 34.

The laser beam 20 is reflected at the medium 11 and this reflected beam passes to the beam splitter 33 through the objective lens 34 and there the traveling direction of the beam is changed by 90°. Then, this turned beam passes to a tracking servo detector 37 through a half-wave plate 35 and a beam splitter 36 and at the same time part of the turned beam is again turned by 90° at the beam splitter 36 and passes to a focusing servo detector 39 through a condenser lens 38.

FIG. 4(b) is a schematic diagram showing a circuit configuration for taking out reproduced signals from the magneto-optic recording information medium 11 by using the above-mentioned optical system.

In this figure, detected signals of the tracking servo detector 37 is inputted at a (−) terminal of an operational amplifier 40 and detected signals of the focusing servo detector 39 is inputted at a (+) terminal of the operational amplifier 40. The output of this operational amplifier 40 is the reproduced signals.

Now, information is practically recorded on the magneto-optic recording information medium 11 along a concentric circular or spiral track on it as is omitted in FIG. 1(a).

FIG. 5 is a schematic plan view showing a track configuration. The track is configured of a convex land portion 52 on its middle and groove portions 51 elongated on both sides of the land portion 52, and the land portion 52 of each track is side by side with a next land portion 52 interposing the groove portions 51.

When information is recorded on such a track on the magneto-optic recording information medium 11, laser beams with two kinds of intensities $R_0$ and $R_1$ are used. When recorded with high output (high power) of the intensity $R_1$, a high power mark 53 formed on the track of the magneto-optic recording information medium 11 (shown with "H" in FIG. 5) is enlarged in a radial direction of the medium 11 (upward and downward in the figure) due to thermal diffusion.

On the other hand, when recorded with low output (low power) of the intensity $R_0$, a low power mark 54 formed on the track of the medium 11 as shown with "L" is not so enlarged in a radial direction of the medium 11.

FIG. 6 shows a state in which the low power mark 54 is overwritten on the high power mark 53 once recorded, in other words, the high power mark 53 is erased. That is, when the low power mark 54 is overwritten on the high power mark 53 that has pushed out portions on both the groove portions 51 on both sides of the land portion 52, unerased portions 55 of the high power mark 53 remain on both sides of the land portion 52 and on both the groove portions 51. A length between two arrows denoted with reference numeral 56 indicates the width of the low power mark 54.

As shown in FIG. 6, when the unerased portions 55 of the high power mark 53 remain in a large area on the land portion 52, practically, information corresponding to the low power mark 54 may be deemed to have been recorded, nevertheless, information of the magneto-optic recording information medium 11 might be read as if information corresponding to the high power mark 53 were recorded due to the effect of the unerased portions 55.

The reason why these unerased portions 55 remain is as follows.

In the conventional magneto-optic recording apparatus, one laser beam with high intensity $R_1$ and the other laser beam with low intensity $R_0$ are used for information recording. These intensities are usually fixed and the ratio of both the intensities is a constant value depending on a apparatus. Then, a relation between projected beam intensity distribution and temperature rise area by heating is shown in FIG. 7 and FIG. 8.

When a signal to be recorded is "1", the beam intensity is brought to the high intensity $R_1$ as shown in FIG. 7. On an area $A_1$ heated by light beams with intensities more than the high intensity $R_1$, information corresponding to a signal "1" (high power mark 53) is recorded. On an area $A_0$ heated by light beams with intensities between the high intensity $R_1$ and the low intensity $R_0$, information corresponding to a signal "0" (low power mark 54) is recorded. The low power mark 54 corresponding to a signal "0" is recorded, in other words, this means that when the high power mark 53 corresponding to a signal "1" has been already recorded, this information is erased. Further, on an area $A_i$ heated by light beams with intensities less than the low intensity $R_0$, information is neither recorded nor erased, that is, neither the high power mark 53 nor the low power mark 54 is recorded and a former state is maintained.

When a signal to be recorded is "0", the beam intensity is brought to the low intensity $R_0$ as shown in FIG. 8. On an area $A_0'$ heated by light beams with intensities than the low intensity $R_0$, information corresponding to a signal "0" (low power mark 54) is recorded. Information corresponding to a signal "0" is recorded, in other words, this means that when the high power mark 53 for a signal "1" has been already recorded, this information is erased. On an area $A_i'$ heated by light beams with intensities less than the low intensity $R_0$, information is neither recorded nor erased, that is, neither the high power mark 53 nor the low power mark 54 is recorded and a former state is maintained.

As can be seen from the foregoing, the high power mark 53 for a signal "1" has already been recorded on a track and thereafter when the low power mark 54 for a signal "0" is overwritten on this track, in the case where the area $A_1$ indicating the high power mark 53 in FIG. 7 is greater than the area $A_0'$ indicating the low power mark 54 in FIG. 8, the high power mark 53 previously recorded is not completely erased and unerased portions remain.

Now, the schematic diagram in FIG. 6 shows that both centers of the high power mark 53 and the low power mark 54 overwritten on the former are on the center line of the land portion 52, that is, track offset, which is control error for displacement to the track (land portion 52) center line, is "0".

FIG. 9 is a schematic diagram showing that the above-mentioned track offset is not "0". In the figure, the high power mark 53 is recorded with the track offset "0", but the low power mark 54 overwritten on the former is recorded on the land portion 52 with the track offset of a width denoted with a reference numeral 59. That is, a two-dot broken line denoted with reference numeral 58 is the track center line (also center line of the land portion 52) and a one-dot broken line denoted with reference numeral 57 is a center line of the low power mark 54 and a distance between both the lines is the track offset 59.

Now, when the track offset 59 exceeds a certain value, the unerased portion 55 of the high power mark 53 remains in a large area on the land portion 52 after the high power mark 53 was erased by the low power mark 54. FIG. 9 is a schematic diagram showing such a state, wherein the low power mark 54 is greatly downward offset and thus the upper unerased portion 55 remains in a large area on the land portion 52 in the drawing.

As shown in FIG. 9, when the unerased portion 55 of the high power mark 53 remains in a large area on the land portion 52, practically information corresponding to the low power mark 54 may be assumed to have been recorded, nevertheless, information of the magneto-optic recording information medium 11 might be read as if information corresponding to the high power mark 53 were recorded due to the effect of the unerased portion 55.

As mentioned above, in the conventional methods of information recording on the magneto-optic recording information medium and the magneto-optic recording apparatuses, two kinds of light beams are used and the intensity of each beam is fixed, in addition the track offset arises, thus the high power mark corresponding to a signal "1" is not completely erased and the unerased portion remains. Thus there is a problem of how to completely erase the high power mark.

SUMMARY OF THE INVENTION

This invention is attained in view of this circumstances and it is a principal object of the present invention to provide a method of information recording onto a magneto-optic recording information medium and a magneto-optic recording apparatus which are capable of avoiding misrecognition of signals caused by an unerased high power mark portion generated when a low power mark for a signal "0" is overwritten on a high power mark for a signal "1".

Among the information recording methods for the magneto-optic recording information medium according to the invention, in the first invention, a width of the mark formed by a low intensity light beam between two kinds of light beams of different intensities is brought to a width more than sum of the track land width and the maximum error for light beam position control to the track center line, that is, the maximum track offset. Information is overwritten under this condition. Thereby, in the case where the track offset arises, the mark recorded by the low intensity light beam covers the whole track land portion, thus the previously recorded mark is perfectly overwritten and no unerased portion remains.

Among the methods of the invention, in the second invention, a beam intensity ratio of the two kinds of beam intensities used for information recording is made variable, thereby when the light beam is controlled in such a way that a heated area generated by the low intensity light beam is larger than a heated area generated by the high intensity light beam, the previously recorded mark is perfectly over-written and the no unerased portion remains.

Further, among the magneto-optic recording apparatuses according to the invention, the apparatus of the first invention is provided with means for splitting a reflected beam from the magneto-optic recording information medium into a reflected beam for reproducing information and a reflected beam for tracking servo and means for removing part, which is affected by the groove portions, of the former. In this case, the removement is effected on a light path of the reflected beam or on a light reception surface of a reproduced signal detector. By this means, following the track is performed as same as in the conventional manner and the part affected by the groove portions of the reflected beam for reproducing information is removed, thus information can be correctly read and accuracy of the reproduced signals is improved.

Further, among the magneto-optic recording apparatuses of the invention an apparatus of the second invention is provided with means for varying an intensity ratio of two kinds of beam intensities beams used for recording information. By using this means when the two beams are controlled in such a manner that the heated area of the track generated by the low intensity beam is larger than the heated area generated by the high intensity beam, a previously recorded mark is perfectly overwritten and no unerased portion remains.

The above and further objects and features of the invention will more fully be apparent from the following detailed description with accompanying drawings.

BRIEF DESCRIPTION OF THE DRAWINGS

FIG. 10 and FIG. 11 are schematic diagrams explaining the methods of the invention, in which FIG. 10 shows a state of the track offset being "0", and FIG. 11 a state of the track offset being maximum, FIG. 13 is a schematic diagram showing a configuration of a slit (light reception surface of the reproduced signal detector) disposed on an optical path of the optical system of FIG. 12(a), FIG. 17 is a schematic side section diagram showing a magneto-optic recording information medium having four magnetic layers which is used for other embodiment of the inventions, and FIG. 18 is an explanatory view showing change force among the magnetic layers of FIG. 17.

DESCRIPTION OF THE PREFERRED EMBODIMENTS

Figure 1A:
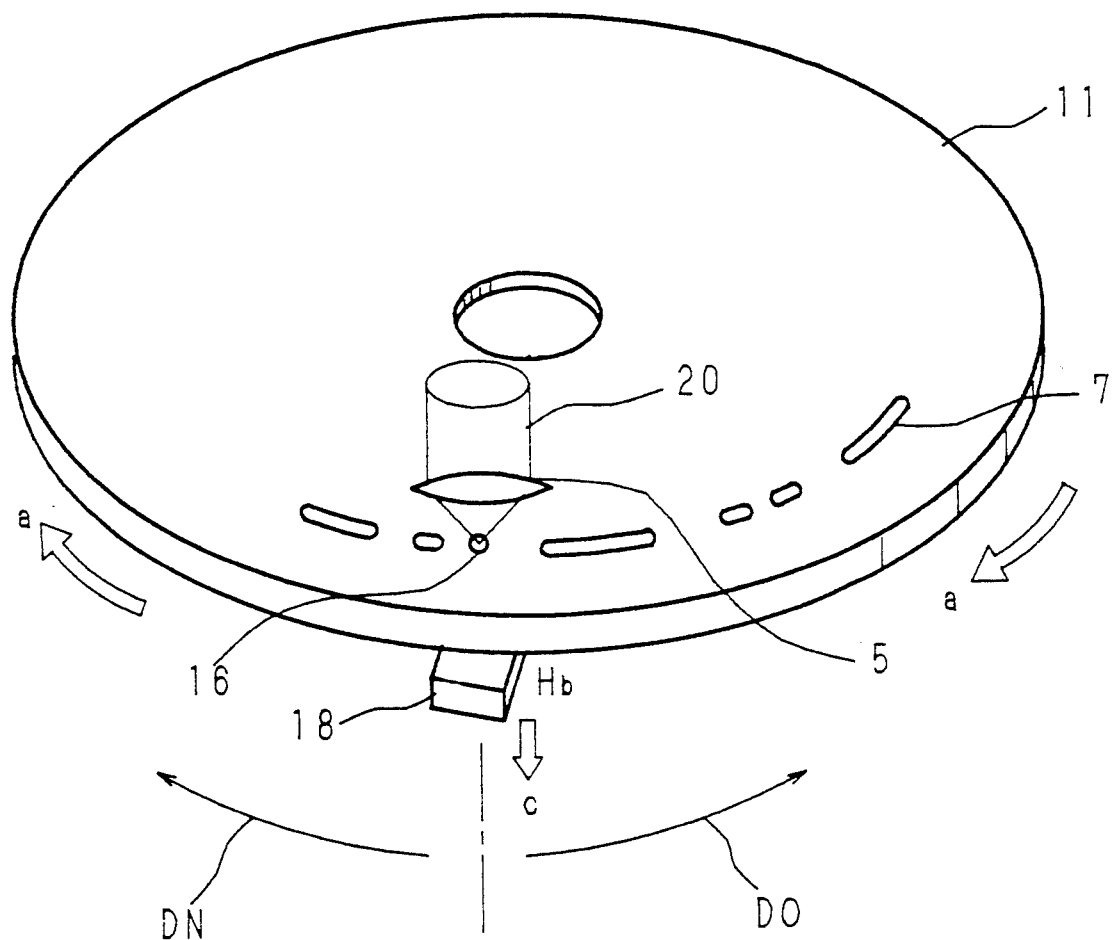
FIG. 1(a) is a schematic diagram showing an essential part of a magneto-optic recording information medium and its information reading apparatus according to this invention.
Figure 1B:
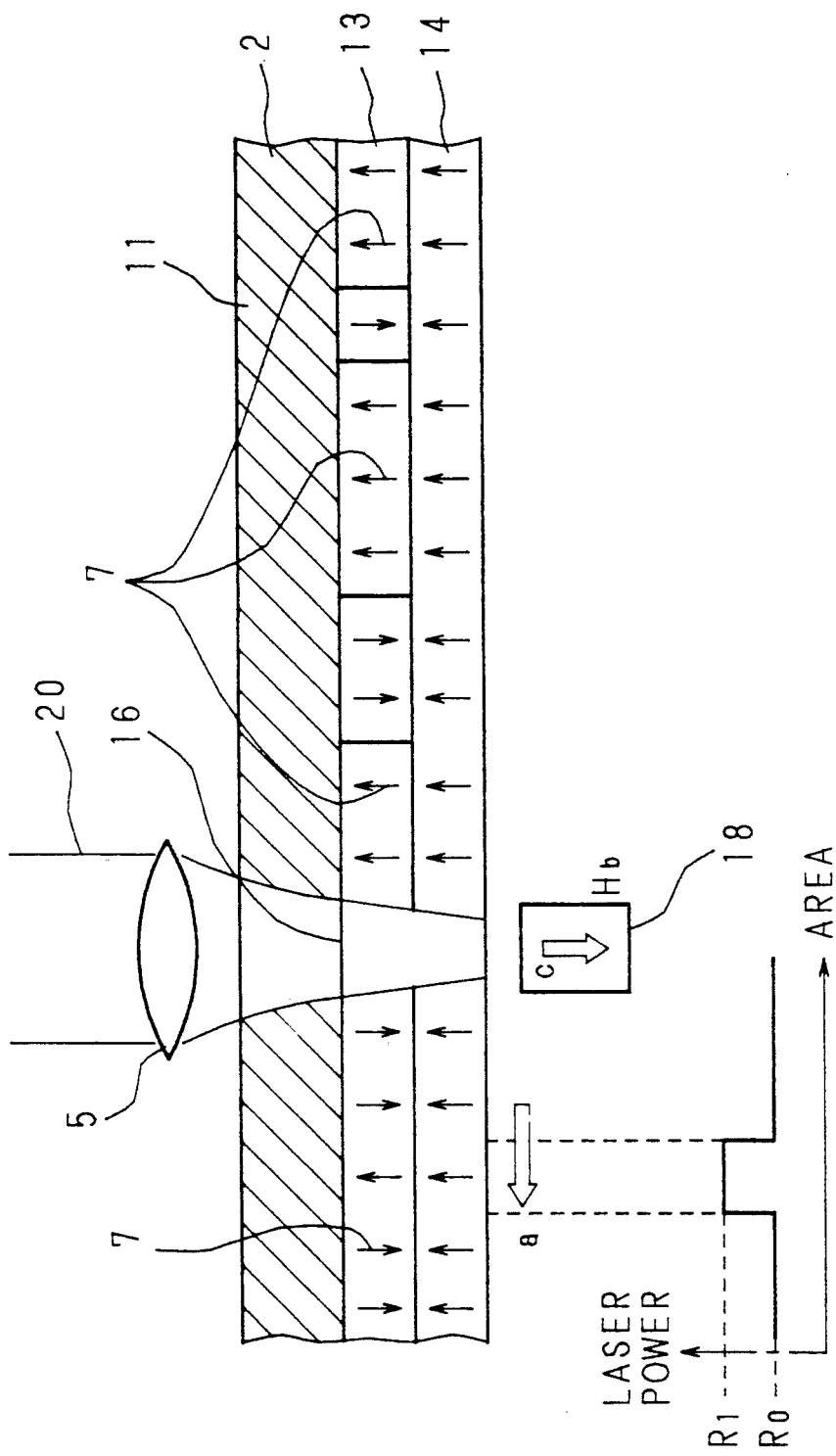
FIG. 1(b) is a partial section taken along a circumference of the magneto-optic recording information medium and also includes a graph showing a condition of change in laser beam power for information recording on the medium.
Figure 2:
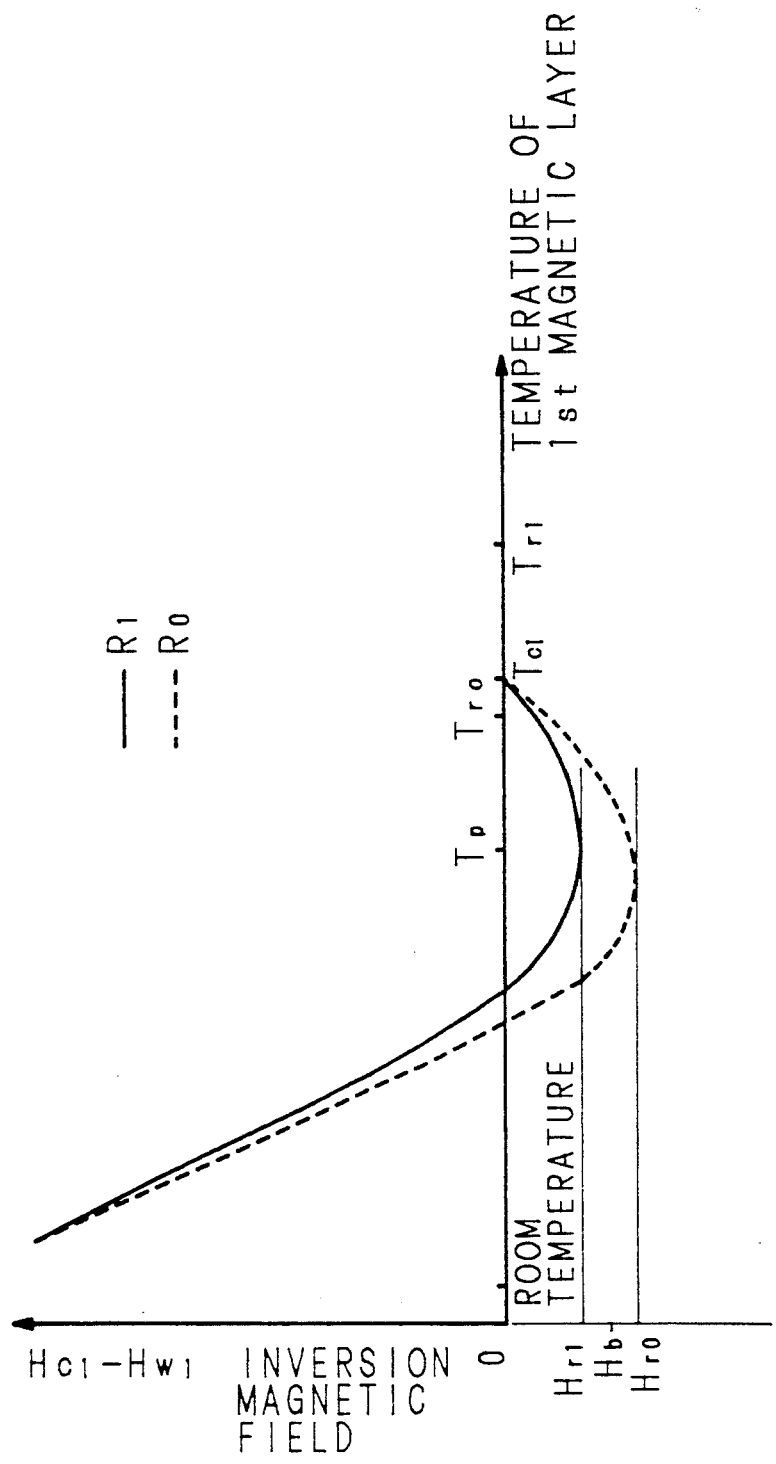
FIG. 2 is a graph showing a relation between inversion magnetic fields and temperatures in the first magnetic layer of the magneto-optic recording information medium according to this invention.
Figure 3:
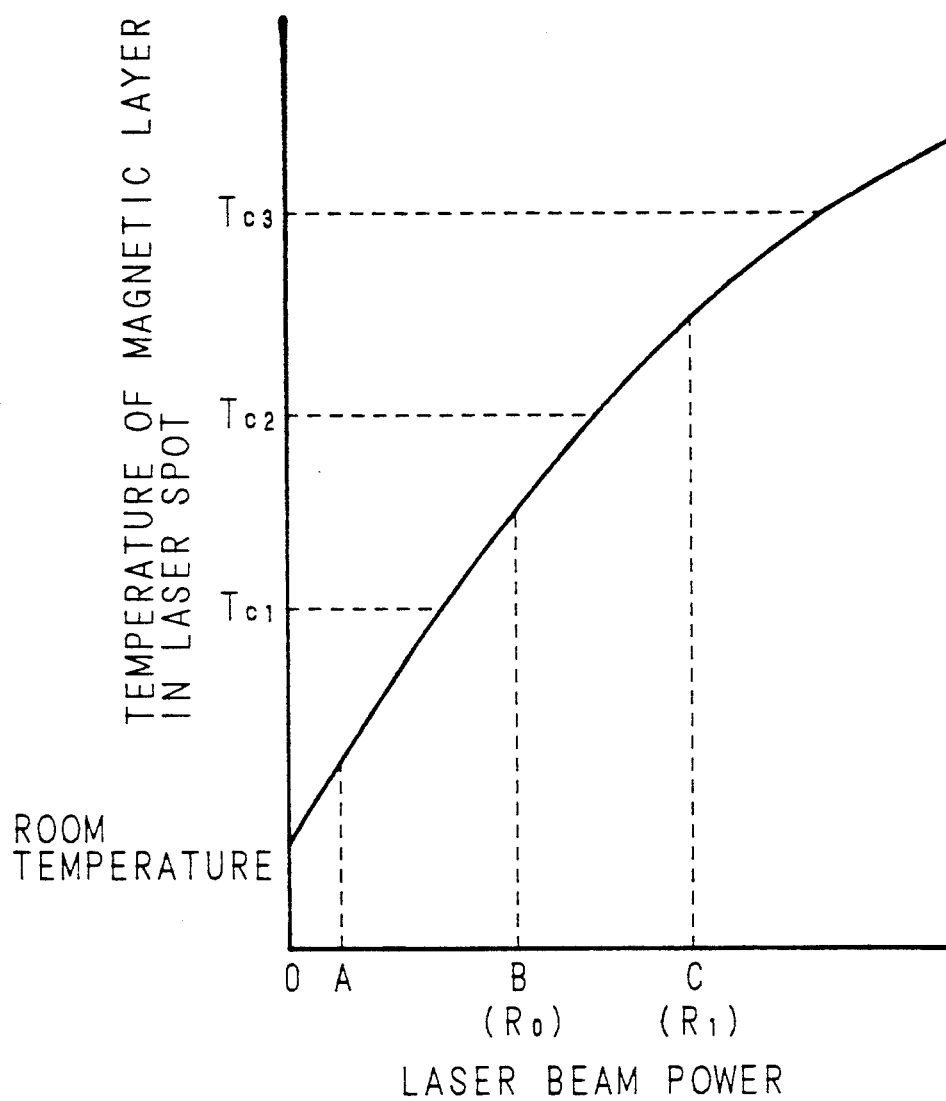
FIG. 3 is a graph showing relations between the laser beam intensities and temperatures of magnetic layer in the laser spot on the magneto-optic recording information medium.
Figure 4A:
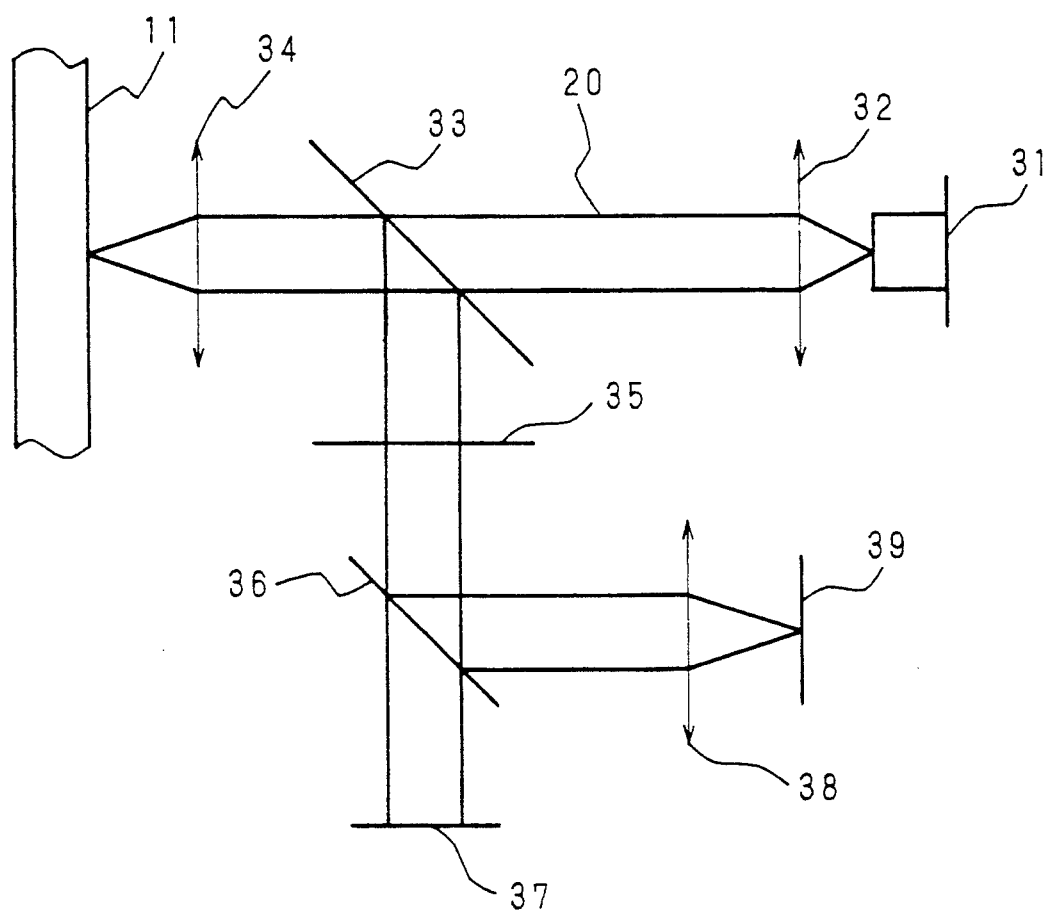
FIG. 4(a) is a schematic diagram showing an optical system configuration of the conventional magneto-optic recording apparatus.
Figure 4B:
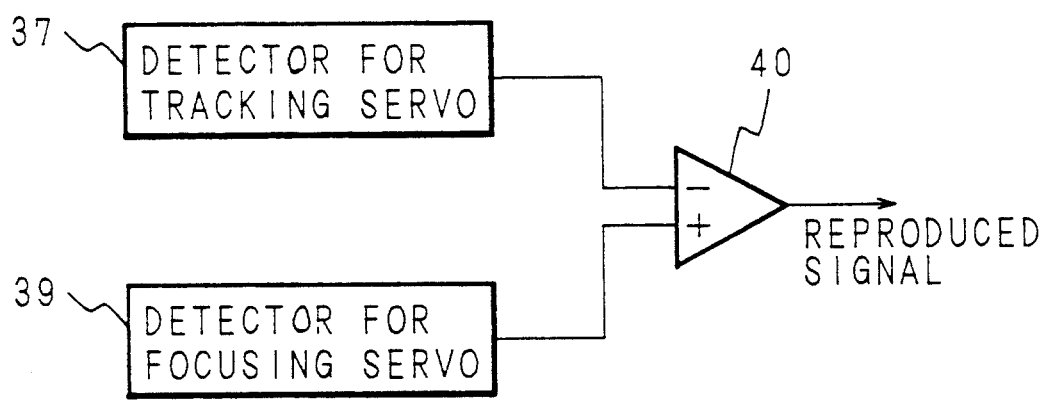
FIG. 4(b) is a schematic diagram showing a configuration of a signal reproducing system.

The embodiments of the invention will be described in detail referring to the drawings.

Figure 10:
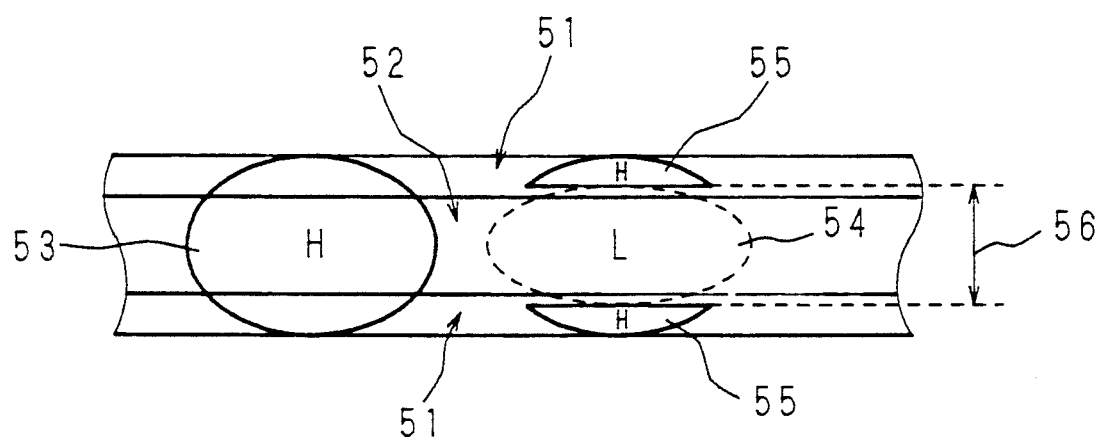

FIG. 10 is a schematic diagram showing a state of information recording using the method of the first invention among the information recording methods for the magneto-optic recording information medium according to the invention.

Figure 5:
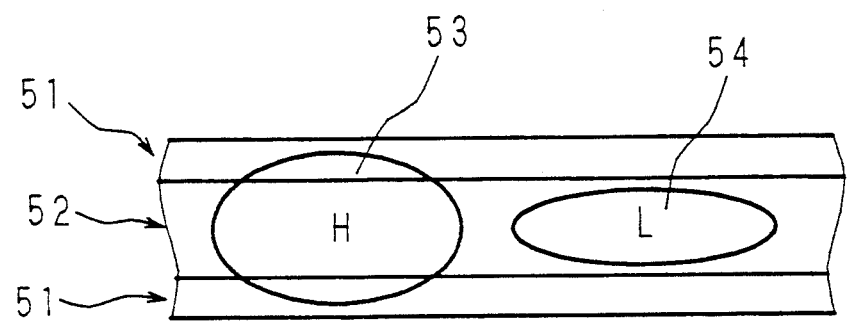
FIG. 5 is a schematic diagram showing a state of information recording on a track of the magneto-optic recording information medium by using the high power mark and low power mark.
Figure 6:
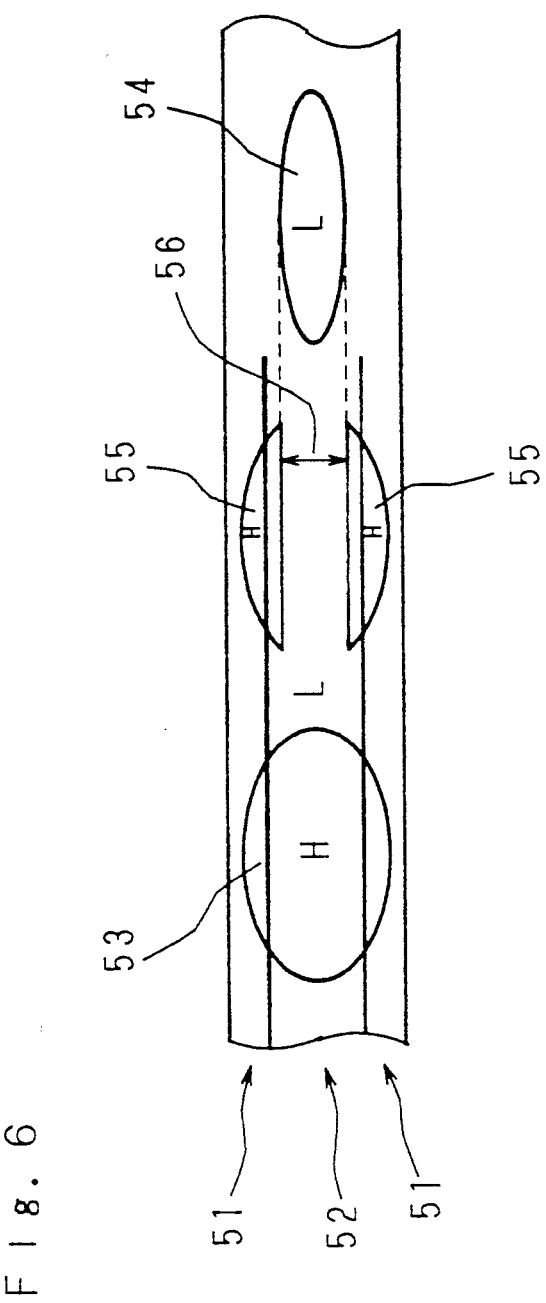
FIG. 6 is a schematic diagram showing that the low power mark is overwritten on the high power mark.
Figure 7:
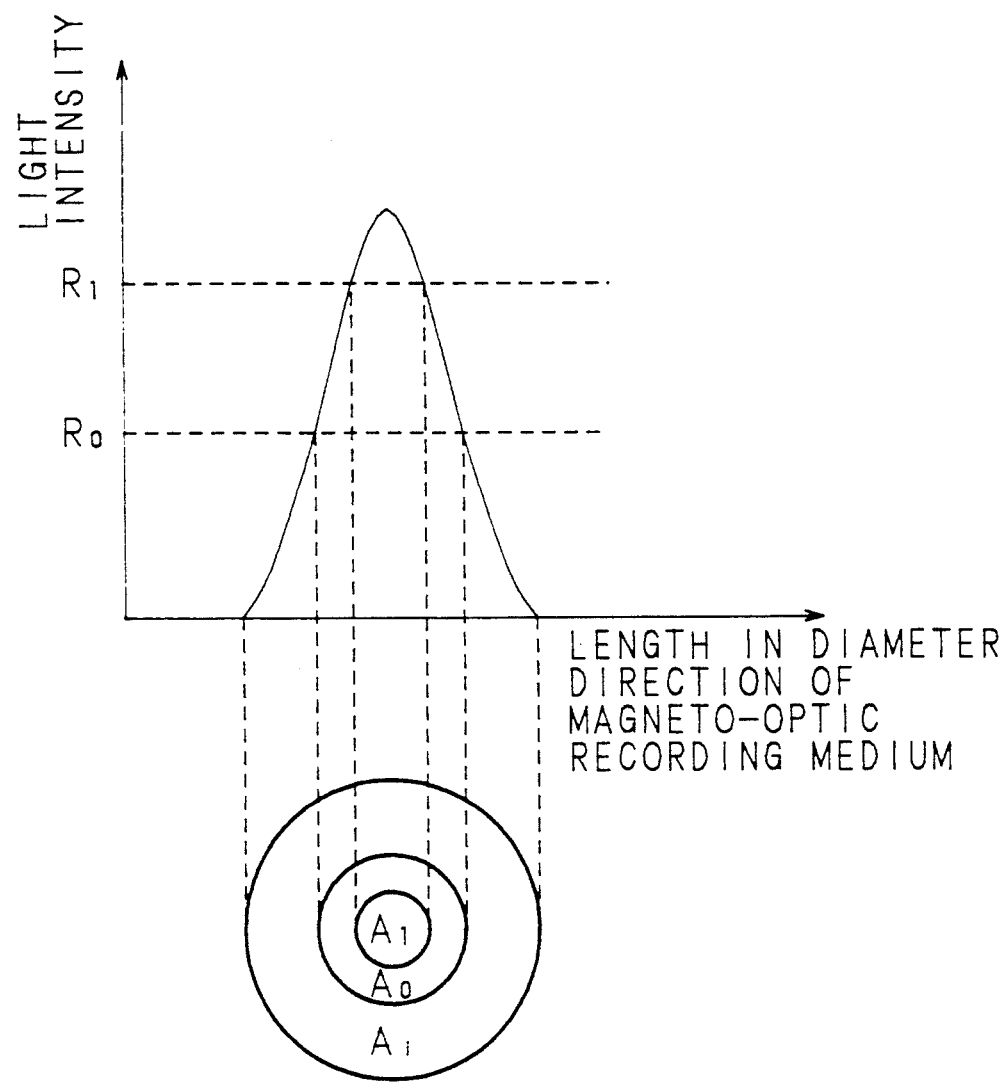
FIG. 7 and FIG. 8 are graphs and schematic diagram showing a relation between the light beam intensity distribution and the heated area thereby when the light beam is projected on the magneto-optic recording information medium by using the conventional method and apparatus.
Figure 8:
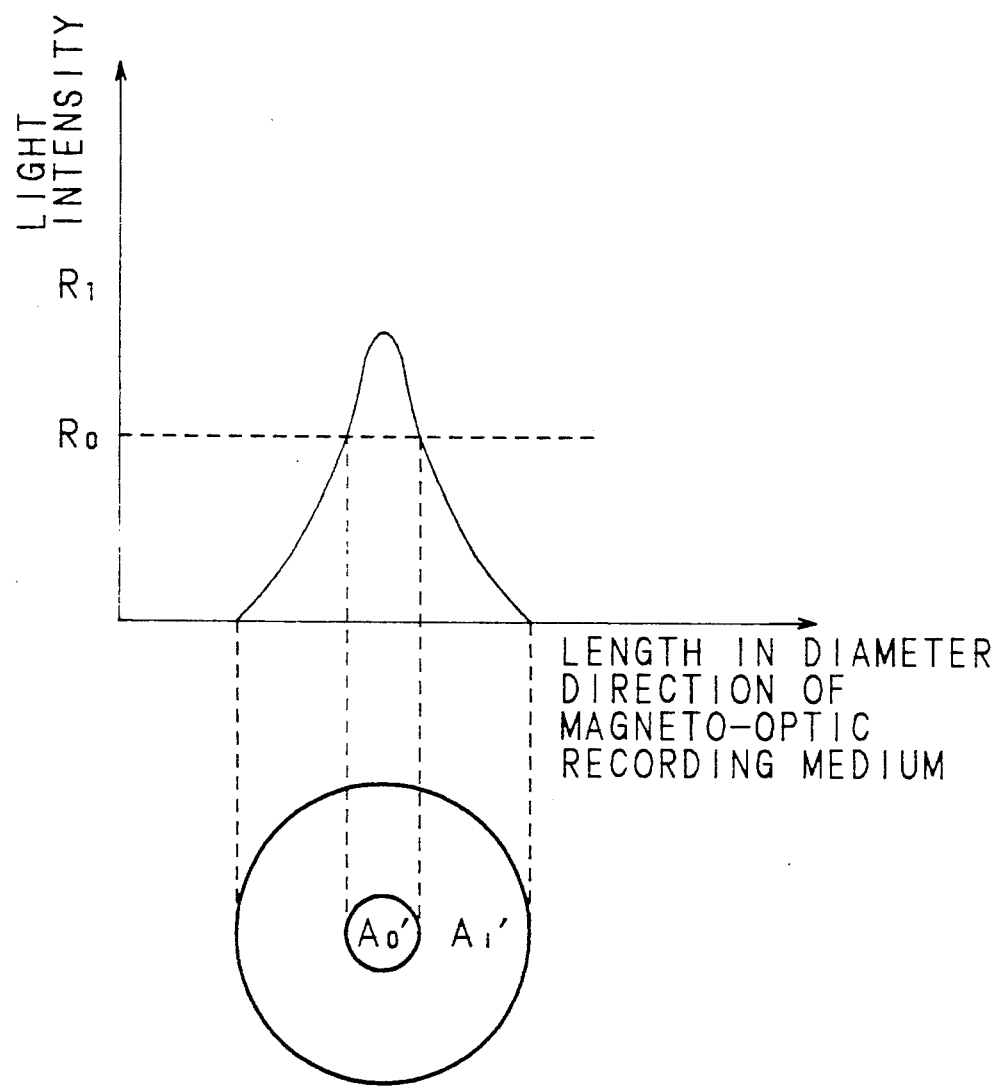
Figure 9:
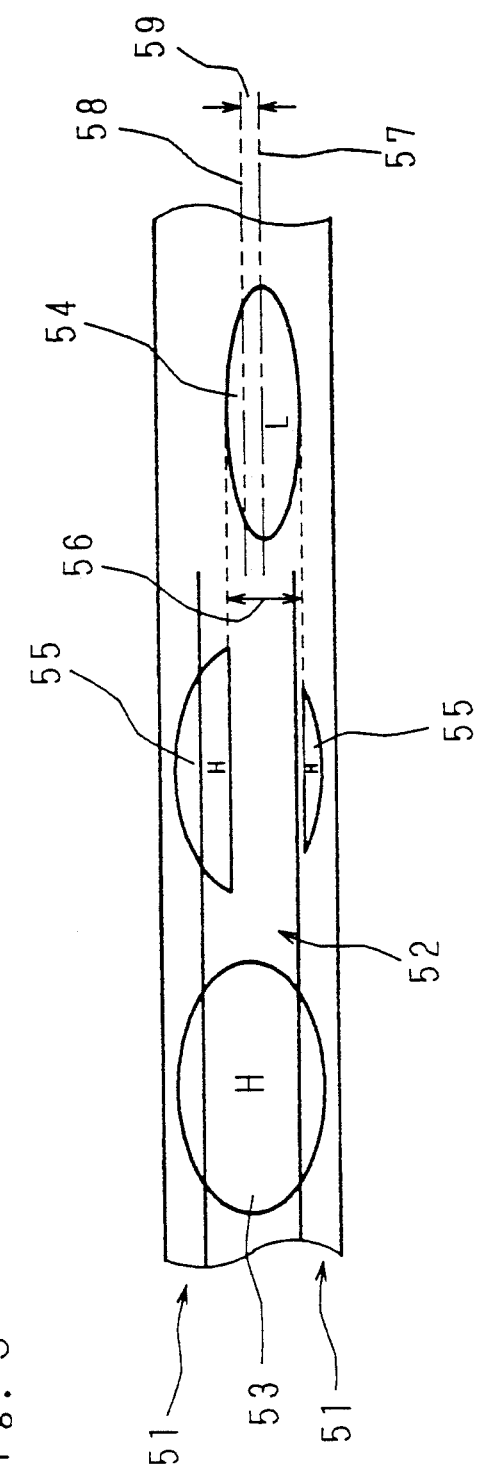
FIG. 9 is a schematic diagram showing a state of the track offset being not "0", when the conventional information recording method for the medium is used.

In this figure, the recording width of the low power mark 54 on the track is set to become wider than sum of the width of the land portion 52 and the maximum track offset 59. In this case, the width of the high power mark 53 is made wider than that shown in FIG. 5, but there is no problem about it as long as the high power mark 53 is within the groove portions 51 on both sides of the land portion 52.

In FIG. 10, a state is shown in which the low power mark 54 is overwritten on the high power mark 53 with the track offset 59 being "0". In this case, the low power mark 54 is protruded by a half of the maximum track offset to each groove portion 51 on both sides of the land portion 52. Thus, at reading information, misreproducing can not be generated because no unerased portion 55 exists on the track land portion 52.

Figure 11:
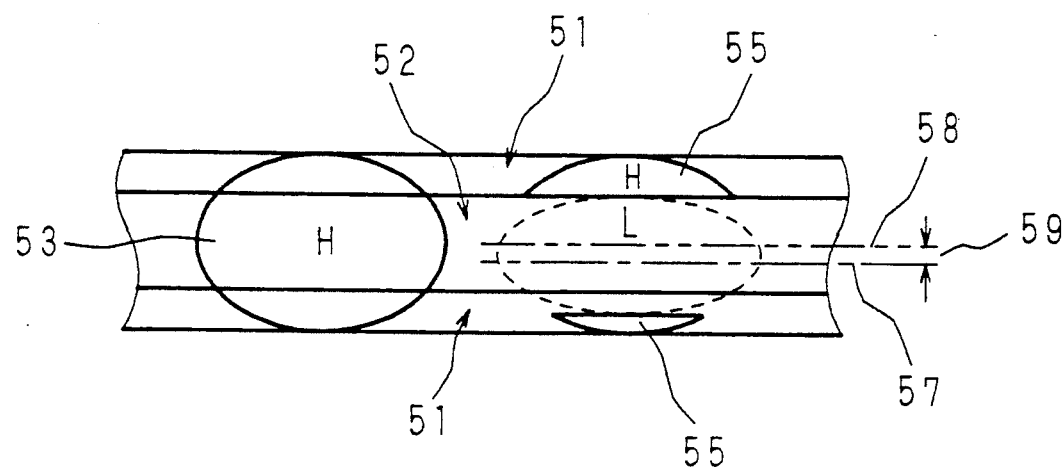

FIG. 11 shows a state in which the low power mark 54 is overwritten on the high power mark 53 with the track offset 59 being maximum. In this case, the low power mark 54 protrudes with equal to the maximum track offset to one of the groove portions 51 on one side of the land portion 52, but retracts to just a boundary between the land portion 52 and the other groove portion 51. Thus, at reading information, reproducing can not be caused because no unerased portion 55 exists on the track land portion 52.

Now, the apparatus of the first invention will be described in detail based on the drawings of its embodiment.

Figure 12A:
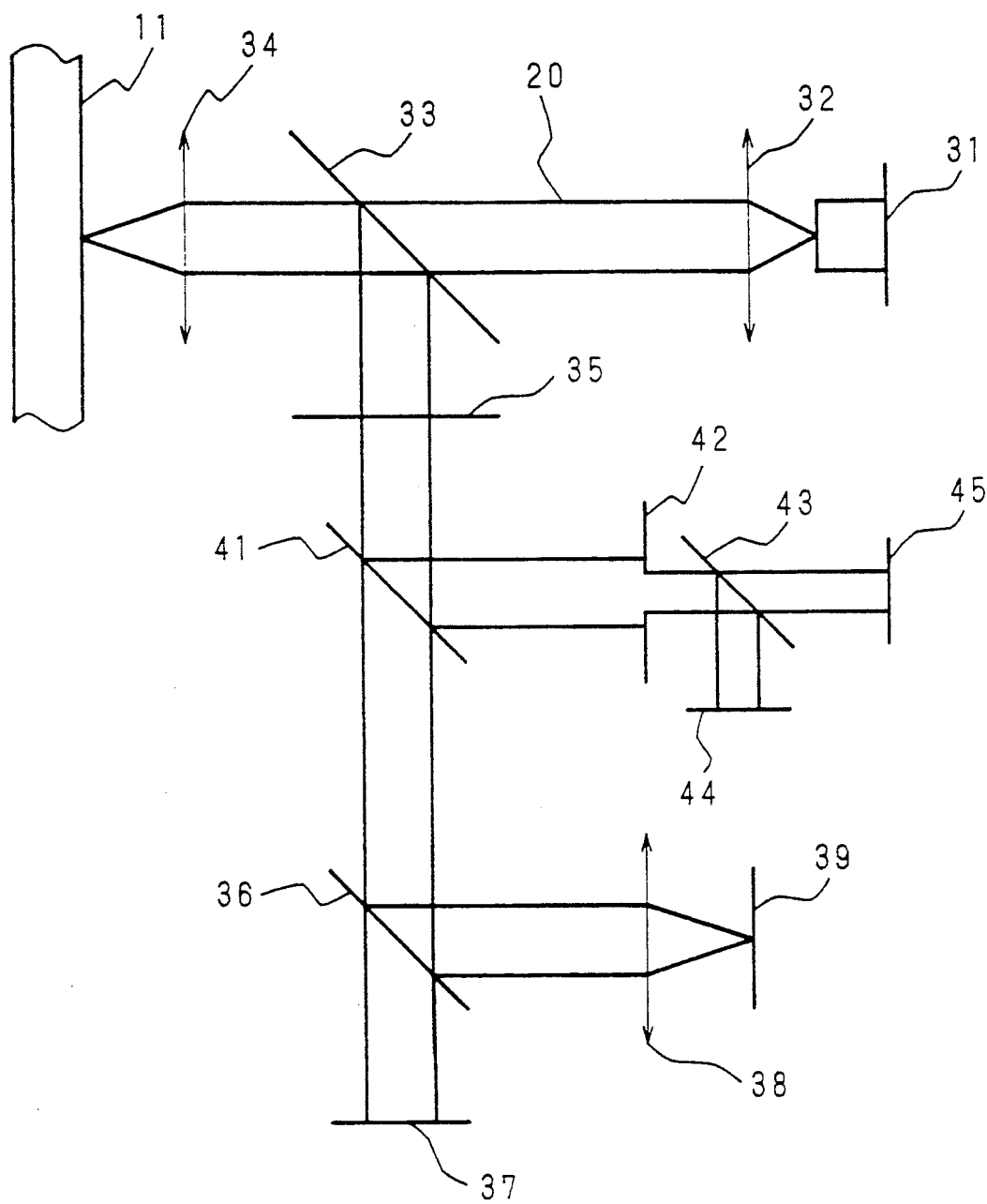
FIG. 12(a) is a schematic diagram showing an optical system configuration of a magneto-optic recording reproducing apparatus according to the first invention.

FIG. 12(a) is a schematic diagram showing an optical system configuration of the magneto-optic recording reproducing apparatus according to the first invention.

In this figure, numeral 11 denotes the above magneto-optic recording information medium, a laser beam 20 emitted from a beam emitting element 31 is projected on the medium 11 through a collimator lens 32, a beam splitter 33, and an objective lens 34.

The laser beam 20 is reflected at the magneto-optic recording information medium 11 and passes to the beam splitter 33 through the objective lens 34 and there its traveling direction is turned by 90° and the beam passes to a tracking servo detector 37 through a half-wave plate 35, a beam splitter 41, and a beam splitter 36. At the same time, the direction of part of the beam is turned by 90° at the beam splitter 36 and this beam passes to a focusing servo detector 39 through a condenser lens 38.

On the other hand, the traveling direction of part of the beam is turned by 90° at the beam splitter 41 and the beam passes to a beam splitter 43 through a slit 42 and there, is split into two directions and projected on reproduced signal detectors 44 and 45 respectively.

That is, in the magneto-optic recording apparatuses of the first invention, the optical system has the conventional configuration and further includes the beam splitter 41 between the beam splitters 33 and 36. As mentioned above, the beam splitter 33 changes the direction of the reflected beam from the magneto-optic recording information medium 11 and the beam splitter 36 splits the reflected beam, whose direction is changed by the splitter 33, into a beam for the tracking servo detector 37 and a beam for the focusing servo detector 39. Thus by using this beam splitter 41, part of the reflected beam from the magneto-optic recording information medium 11 is taken out to be projected onto the reproduced signal detectors 44 and 45 through the slit 42 and the beam splitter 43.

Figure 12B:
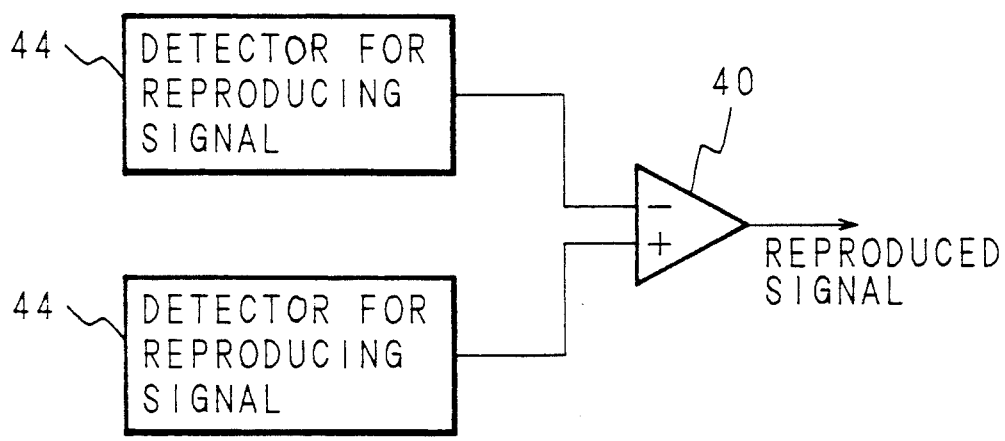
FIG. 12(b) is a schematic diagram showing a signal reproducing system configuration of the above apparatus.

FIG. 12(b) is a schematic diagram showing a system configuration for taking out the reproduced signals from the medium 11 with the optical system of the apparatus of the first invention.

In this configuration, detected signals of the reproduced signal detector 44 is inputted at a (−) terminal of an operational amplifier 40 and detected signals of the reproduced signal detector 45 is inputted at a (+) terminal and an output of the operational amplifier 40 is the reproduced signal.

Now, in the optical system of the magneto-optic recording apparatus of the first invention, the slit 42 is interposed between the beam splitters 41 and 43. This slit 42 is so formed that it curs both sides of the width of the reflected beam from the medium 11 as shown in the schematic diagram of FIG. 13. More particularly, hatched portions of the slit 42 in FIG. 13 are light shield portions.

By interposing the slit 42 having such shape on an optical path between the beam splitter 41 and the reproduced signal detectors 44, 45, the system can remove parts 62 and 63 of the reflected beam from the groove portions 51 which are affected by the unerased portions 55 generated when the low power mark 54 is overwritten on the high power mark 53 as shown in FIG. 10, thus the system can project onto the reproduced signal detectors 44 and 45 only part 61 of the reflected beam indicative of correct information.

Figure 14:
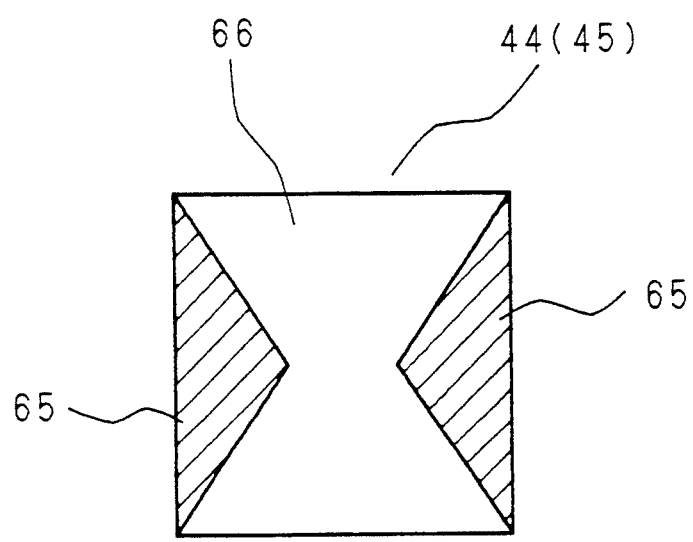
FIG. 14 is a schematic diagram showing a configuration of a light reception surface of the reproduced signal detector.

Further, in the above embodiment, the slit 42 is placed on a branch light path toward the detector 45 after the reflected beam from the medium 11 is split at the splitter 41 from the direction of the tracking servo detector 37 or the focusing servo detector 39, but as an alternative a configuration shown in FIG. 14 is usable. That is, the light reception surface of each reproduced signal detector 44, 45 is comprised of an incident light detective surface 66 and light shield non-sensitive portions 65. In this case, it is needless to say that the non-sensitive portion 65 corresponds to the reflected beam part affected by the unerased portions 55 shown in FIG. 10.

Needless to say, it is possible to apply the configuration such as the slit 42 of FIG. 13 rather than the shape of FIG. 14 as the light reception surface of the reproduced signal detector 44 or 45 and a shape is also usable which is made by linearly narrowing a portion of the light reception surface corresponding to both edges of the track.

Figure 15:
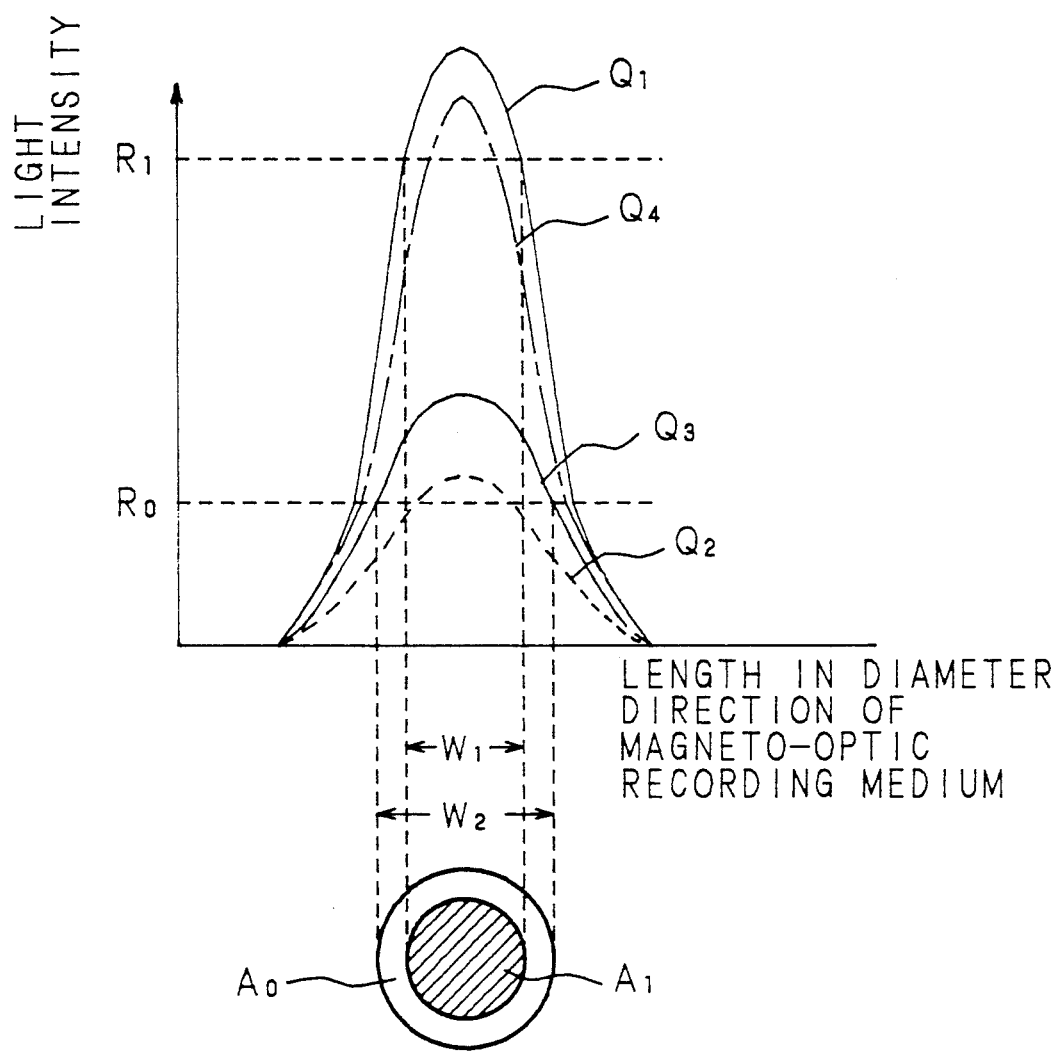
FIG. 15(a) and 15(b) are a graph and a schematic diagram showing a relation between the light beam intensity distribution and the heated area thereby when the light beam is projected on the magneto-optic recording information medium by using the method and apparatus of the second invention.

FIG. 15 is a graph for explaining the principle of the information recording method for the magneto-optic recording information medium and the information recording apparatus according to the second invention.

When a signal "1" is recorded on the magneto-optic recording information medium 11, the beam intensity is so controlled that it conforms to a curve $Q_1$ of FIG. 15, thereby an area $A_1$ heated by intensities more than the high intensity $R_1$ has a diameter $W_1$ shown with hatching. This area $A_1$ becomes the high power mark 53.

On the other hand, when a signal "0" is recorded, the beam intensity was formerly so controlled that it conforms to a curve $Q_2$ shown with a broken line, and the low power mark 54 with a diameter $W_1$ was recorded on the track. However, in the present invention, when a signal "0" is recorded, the beam intensity is so controlled that it conforms to a curve $Q_3$ stronger than the curve $Q_2$, thereby a diameter of an area $A_0$ heated by intensities stronger than the low intensity $R_0$ becomes $W_2$ increasing larger than $W_1$. This area $A_0$ becomes the low power mark 54.

As mentioned above, when the low power mark 54 is recorded in response to a signal "0" onto the high power mark 53 already recorded in response to a signal "1" with controlling the beam intensity, the diameter $W_2$ of the low power mark 54 is larger than the diameter $W_1$ of the high power mark 53, thus the high power mark 53 is perfectly overwritten by the low power mark 54, that is, erased.

In addition, in FIG. 15, instead of controlling the curve $Q_2$ in such a manner that is conforms to the curve $Q_3$, the curve $Q_1$ may be so controlled that it conforms to the curve $Q_4$ which is shown in a one-dot broken line and reduced somewhat in its intensity. At this time, it is needless to say that the same effect as the former is obtained.

Figure 16:
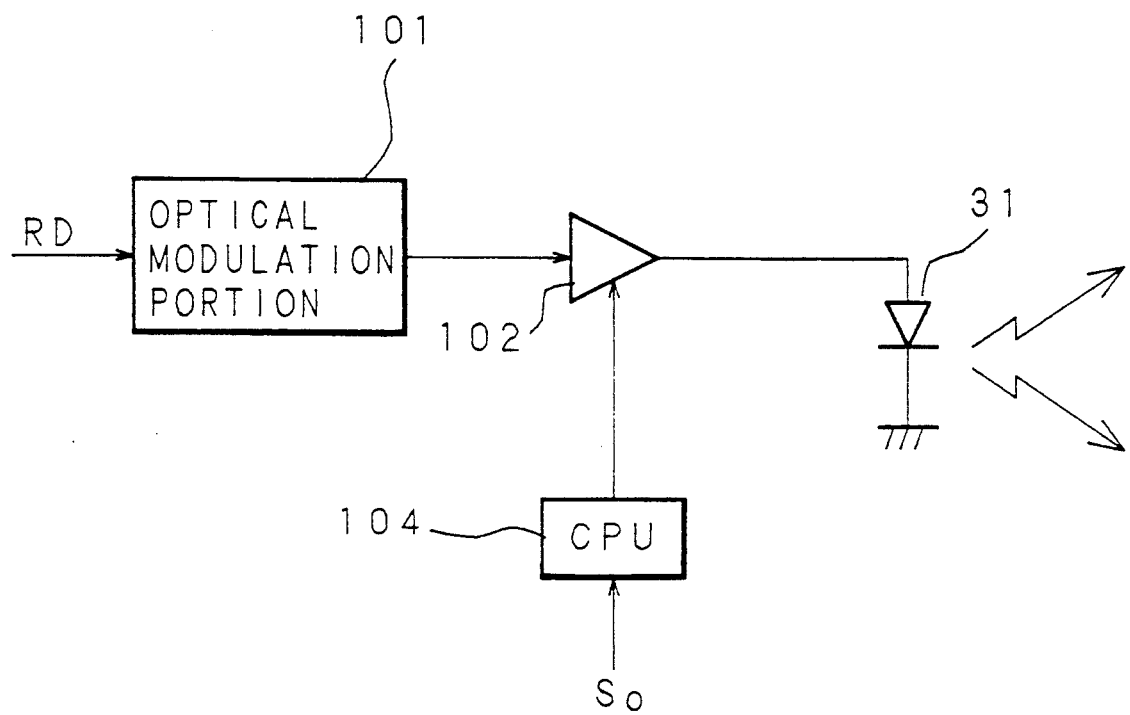
FIG. 16 is a block diagram showing one example of a configuration of the magneto-optic recording apparatus of the second invention.

FIG. 16 is a block diagram showing essential part of the magneto-optic recording apparatus of the second invention based on the above principle.

In FIG. 16, reference numeral 101 denotes a light modulation portion, to which a recording signal RD of "1" or "0", which is to be recorded on the magneto-optic recording information medium 11, is inputted. This light modulation portion 101 generates signals for modulating a light beam in response to the inputted recording signal RD and gives the modulated signals to a beam intensity control portion 102.

The beam intensity control portion 102 generates signals for controlling the beam intensity in response to signals inputted from the light modulation portion 101 and gives them to a semiconductor laser 31 of a light beam emitting element.

Further, control signals outputted from a CPU 104 is given to the beam intensity control portion 102. As shown in FIG. 15, when the low power mark 54 is recorded on the magneto-optic recording information medium 11 in response to a signal "0", the CPU 104 controls the original beam intensity of the curve $Q_2$ in FIG. 15 in such a manner that it conforms to the curve $Q_3$. This control is executed in response to signals So given to the CPU 104.

By using the magneto-optic recording apparatus according to the second invention, the unerased portion of the high power mark 53 does not remain when overwritten by the low power mark 54, thus accuracy of information recording and reproducing is improved.

Further, in the above embodiments, the high power mark 53 is recorded in response to a signal "1", and the low power mark 54 is recorded in response to a signal "0", but recording in such a manner is also possible that the low power mark 54 is recorded in response to a signal "1" and the high power mark 53 is recorded in response to a signal "0" on the magneto-optic recording information medium 11.

As mentioned above in detail, according to the first invention of the information recording methods for the magneto-optic recording information medium, when the low power mark is overwritten onto the high power mark already recorded, the unerased portion does not remain on the land portion, thereby generating no information misreproducing.

In addition, according to the first invention of the information recording apparatus, when information with the low power mark is overwritten onto information with the high power mark already recorded on a track of the magneto-optic recording information medium, effect of the unerased portion contained in the reflected beam from the track can be eliminated.

Still further, according to the second invention of the information recording methods for the magneto-optic recording information medium and to the second invention of the information recording apparatus, when information with the low power mark is overwritten onto information with the high power mark already recorded on a track of the magneto-optic recording information medium, the effect of the unerased portion contained in the reflected beam from the track can be eliminated.

Now, each of the above inventions is explained for the magneto-optic recording information medium 11 having two magnetic layers, and this is for simplification of explanation, but each of the above inventions can also be applied to the medium 11 having three or more magnetic layers. A magneto-optic recording information medium 11 having four magnetic layers shown in FIG. 17 will be explained as one example.

This medium 11 is formed with lamination of a dielectric layer 81 made on, for example, a glass substrate 2 by the sputtering method for example, a first magnetic layer 13 as a recording layer, a second magnetic layer 14 as an auxiliary layer for recording, a third magnetic layer 83 as a control layer, a fourth magnetic layer 84 as an initialization layer, and a protective layer 82 in order. Material and thickness of each layer are as follows:

|  |  |  |
| --- | --- | --- |
| dielectric layer (1) | SiN$_x$ | 65 nm |
| 1st magnetic layer (13) | Tb$_{22}$Fe$_{69}$Co$_9$ | 80 nm |
| 2nd magnetic layer (14) | Gd$_8$Dy$_{17}$Fe$_{60}$Co$_{16}$ | 150 nm |
| 3rd magnetic layer (8) | Tb$_{30}$Fe$_{84}$ | 20 nm |
| 4th magnetic layer (84) | Tb$_{30}$Co$_{70}$ | 40 nm |
| Protective layer (82) | SiN$_x$ | 70 nm |

Characteristics of these magnetic layers 13, 14, 83, 84 are as follows:

Each adjacent magnetic layers are bonded with exchange force.

The first magnetic layer 13 effects information recording and holding.

The second magnetic layer 14, the third magnetic layer 83, and the fourth magnetic layer 84 do not effect as information media and they are added to enable light modulation direct overwriting. The fourth magnetic layer 84 is an initialization layer which does not cause flux reversal of sublattice against temperature rise with laser beam projection within the range of operation and have an effect of opposing a bias magnetic field generated by the magnetic field generator 18.

The third magnetic layer 83 is a control layer which cuts off exchange force coming from the fourth magnetic layer 84 at high temperatures.

Denoting Curie temperature of i-th magnetic layer with Tci; half magnetic field width of an inversion magnetic field (corresponds to coercive force) in the i-th magnetic layer with Hci; exchange force which the i-th magnetic layer receives from adjacent magnetic layers with Hwi, the magnetic characteristics of the magnetic layers 13, 14, 83 and 84 are as following inequalities (a) through e(g):

In addition, the exchange force is a transition width of the i-th magnetic layer and as to the second magnetic layer 14 and the third magnetic layer 83, it is defined for flux reversal as shown in FIG. 18.

|  |  |  |
| --- | --- | --- |
| Tc$_4$ > (Tcomp$_4$) > Tc$_2$ > Tc$_1$ > (Tcomp$_2$) > Tc$_3$ > room temperature . . . (a) | | |
| 1st magnetic layer | Hw$_1$ < Hc$_1$; | to room temperature . . . (b) |
|  | Hw$_1$ > Hc$_1$; | to Tc$_1$ . . . (c) |
| 2nd magnetic layer | Hw$_2$ > Hc$_2$; | to Tc$_3$ . . . (d) |
|  | Hw$_2$ < Hc$_2$; | to Tc$_1$ . . . (e) |
| 3rd magnetic layer | Hw$_3$ > Hc$_3$; | to Tc$_3$ . . . (f) |
| 4th magnetic layer | Hw$_4$ < Hc$_4$; | within the range of operating temperature . . . (g) |

The inequality (b) shows that magnetization of the first magnetic layer 13 does not reverse regardless of flux reversal of the second magnetic layer 14 at room temperatures, (d), (f), and (g) show that direction of magnetizations of the second magnetic layer 14, third magnetic layer 83 and fourth magnetic layer 84 are all downward (direction of the protective layer 82) at room temperatures after recording.

When the information recording methods for the magnetooptic recording information medium 11 according to the invention is effected using this medium having four magnetic layers, the unerased portion is perfectly eliminated and the system enables stable recording and reproducing as compared with the fact that when the medium having two magnetic layers is used, the unerased portion caused by beam spot displacement and beam intensity (laser power) fluctuation may greatly impair the reproduced signals.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An information recording method comprising the steps of:
   providing a magneto-optic recording information medium which has a plurality of laminated magnetic layers with vertical magnetic anisotropy, the plurality of laminated magnetic layers including a first layer which keeps its direction of magnetization constant and does not exhibit flux reversal at recording and reproducing, and the plurality of laminated magnetic layers further including a second layer which holds information recorded in the second layer as a sequence of first portions having an initial magnetization direction and second portions having a magnetization direction differing from the initial magnetization direction, the magneto-optic recording medium further having a track with a land portion the land portion defined by groove portions elongated on both sides of said land portion;
   representing information to be recorded as two kinds of light beams of different intensities;
   projecting said two kinds of light beams substantially onto said land portion of said track so as to cause some portions of said track to assume the initial magnetization direction and to cause other portions of said track to assume the magnetization direction differing from the initial magnetization direction; and
   controlling the intensity of said two kinds of light beams in such a manner that each of the portions of said track caused to assume the initial magnetization direction extends across the land portion at least to the groove portions, and is larger than each of the portions of said track caused to assume the magnetization direction differing from the initial magnetization direction in said second layer.

2. An information recording method for a magneto-optic recording information medium as set forth in claim 1, wherein said step of representing further comprises a step of generating said light beams using a laser.

3. An information recording method for a magneto-optic recording information medium as set forth in claim 1, wherein said step of providing a magneto-optic recording information medium includes a step of providing the plurality of laminated magnetic layers with four laminated magnetic layers.

4. An information recording method for a magneto-optic recording information medium as set forth in claim 1, wherein said step of providing a magneto-optic recording information medium further comprises a step of forming said plurality of laminated magnetic layers with a lamination of

| dielectric layer | SiNx | 65 nm, |
| --- | --- | --- |
| magnetic layer | $Tb_{22}Fe_{69}Co_9$ | 80 nm, |
| magnetic layer | $Gd_8Dy_{17}Fe_{60}Co_{15}$ | 150 nm, |
| magnetic layer | $Tb_{30}Fe_{84}$ | 20 nm, |
| magnetic layer | $Tb_{30}Co_{70}$ | 40 nm, and |
| protective layer | SiNx | 70 nm | on a substrate in that order.

5. A method for recording binary data on a magneto-optic recording medium, said medium having a track with a land portion, the land portion bounded by groove portions elongated on both sides of the land portion, said medium having a plurality of magnetic layers at said land portion of said track, one of which holds recorded binary data as a sequence of first regions having an initial magnetization direction and second regions having a non-initial magnetization direction, comprising the steps of:

representing said binary data to be recorded as two kinds of light beams of different intensities, one of said different intensities sufficient to cause said one magnetic layer to assume said initial magnetization direction and another of said different intensities sufficient to cause said one magnetic layer to assume said non-initial magnetization direction;

projecting said two kinds of light beams substantially onto said first and second regions on said land portion of said track; and controlling said different intensities of said two kinds of light beams such that each of said first regions assuming said initial magnetization in response to said one of said different intensities extends across the land portion at least to the groove portions, and is larger than each of said second regions assuming said non-initial magnetization in response to said other of said different intensities and further such that each of said first region extends at least to the groove portions.

6. The method of claim 5, wherein the step of representing said binary data as two kinds of light beams further comprises:

modulating a laser light beam in accordance with a sequence of said binary data so as to form said two kinds of light beam.

7. The method of claim 5, wherein the plurality of magnetic layers includes four magnetic layers, including a recording layer, an auxiliary layer, a control layer and an initialization layer disposed on a substrate in that order, and wherein the step of controlling further comprises:

setting said one of said different intensities to an intensity determined to cause transfer of a magnetization direction from the initialization layer to the recording layer; and setting said other of said different intensities to an intensity determined to cause transfer of a magnetization direction from the auxiliary layer to the recording layer.

* * * * *